(12) United States Patent
Pascall et al.

(10) Patent No.: US 11,053,603 B2
(45) Date of Patent: Jul. 6, 2021

(54) METHOD OF MANUFACTURING A COMPLEX PRODUCT BY AN ADDITIVE PROCESS

(71) Applicant: LAWRENCE LIVERMORE NATIONAL SECURITY, LLC, Livermore, CA (US)

(72) Inventors: Andrew J. Pascall, Livermore, CA (US); Hannah Grace Coe, Livermore, CA (US); Julie A. Jackson, Livermore, CA (US); Susant K. Patra, Brentwood, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 118 days.

(21) Appl. No.: 16/250,206

(22) Filed: Jan. 17, 2019

(65) Prior Publication Data
US 2019/0153609 A1 May 23, 2019

Related U.S. Application Data

(62) Division of application No. 14/823,194, filed on Aug. 11, 2015, now Pat. No. 10,221,498.

(51) Int. Cl.
| | |
|---|---|
| *B33Y 10/00* | (2015.01) |
| *C25D 13/02* | (2006.01) |
| *C25D 1/00* | (2006.01) |
| *B23P 15/26* | (2006.01) |
| *C25D 13/12* | (2006.01) |
| *C25D 15/00* | (2006.01) |
| *C25D 15/02* | (2006.01) |
| *F28F 21/04* | (2006.01) |

(Continued)

(52) U.S. Cl.
CPC .............. *C25D 13/02* (2013.01); *B23P 15/26* (2013.01); *B33Y 10/00* (2014.12); *C22C 26/00* (2013.01); *C25D 1/003* (2013.01); *C25D 13/12* (2013.01); *C25D 15/00* (2013.01); *C25D 15/02* (2013.01); *F28F 3/12* (2013.01); *F28F 21/04* (2013.01); *B23P 2700/10* (2013.01); *B33Y 80/00* (2014.12); *F28D 2021/0029* (2013.01); *F28F 21/02* (2013.01); *F28F 21/08* (2013.01); *F28F 2260/02* (2013.01); *Y10T 29/4935* (2015.01); *Y10T 29/49982* (2015.01)

(58) Field of Classification Search
CPC .......... F28F 3/12; F28F 21/04; F28F 2260/02; F28F 21/08; F28F 21/02; F28D 15/04; F28D 2021/0029; B23P 2700/09; B23P 2700/10; Y10T 29/4935; Y10T 29/49353; Y10T 29/49377

See application file for complete search history.

(56) References Cited

U.S. PATENT DOCUMENTS

| | | | |
|---|---|---|---|
| 4,573,067 | A | 2/1986 | Tuckerman et al. |
| 5,099,311 | A | 3/1992 | Bonde et al. |

(Continued)

*Primary Examiner* — Sarang Afzali
(74) *Attorney, Agent, or Firm* — Eddie E. Scott

(57) ABSTRACT

A method of producing a complex product includes designing a three dimensional preform of the complex product, creating a three dimensional preform of the complex product using the model, depositing a material on the preform, and removing the preform to complete the complex product. In one embodiment the system provides a complex heat sink that can be used in heat dissipation in power electronics, light emitting diodes, and microchips.

6 Claims, 14 Drawing Sheets

(51) Int. Cl.
  *F28F 3/12*   (2006.01)
  *C22C 26/00*  (2006.01)
  *B33Y 80/00*  (2015.01)
  *F28F 21/02*  (2006.01)
  *F28F 21/08*  (2006.01)
  *F28D 21/00*  (2006.01)

(56) References Cited

U.S. PATENT DOCUMENTS

| | | |
|---|---|---|
| 5,309,457 A | 5/1994 | Minch |
| 6,258,237 B1 | 7/2001 | Gal-Or et al. |
| 7,088,432 B2 | 8/2006 | Zhang |
| 7,261,144 B2 | 8/2007 | Thome et al. |
| 8,216,980 B2 | 7/2012 | Clarkin et al. |
| 2011/0033887 A1 | 2/2011 | Fang et al. |
| 2011/0250467 A1* | 10/2011 | Rose ............ C25D 13/12 |
| | | 428/610 |
| 2012/0243180 A1 | 9/2012 | Lee et al. |
| 2015/0357538 A1* | 12/2015 | Hsing Chen ........ H01L 33/60 |
| | | 257/98 |

* cited by examiner

METHOD OF MANUFACTURING A COMPLEX PRODUCT BY AN ADDITIVE PROCESS

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

CROSS-REFERENCE TO RELATED APPLICATIONS

The present application is a Division of U.S. Pat. No. 10,221,498, filed Aug. 11, 2015, the disclosure of which is hereby incorporated by reference in its entirety for all purposes.

BACKGROUND

Field of Endeavor

The present application relates to additive manufacturing and more particularly to additive manufacturing of a complex product.

State of Technology

This section provides background information related to the present disclosure which is not necessarily prior art.

U.S. Pat. No. 7,088,432 for dynamic mask projection stereo micro lithography contains the state of technology information reproduced below.

The present invention uses micro stereolithography to provide a new method to fabricate 3D micro or nano structures that can be used for a wide variety of devices such as micro/nano-electronics, biotechnology, MEMS, biomedical devices and in the manufacture of optical devices such as lenses and mirrors. The invention is based on using advanced dynamic mask projection stereo micro-lithography on a photoresist to form a layer, building an object layer by layer, to achieve ceramic micro-stereolithography for the first time. A 3D solid image, which may be a model designed by CAD software at a PC, is sliced into a series of 2D layers, each 2D layer being displayed at the dynamic mask via micro-mirror deflections projected onto the photoresist.

U.S. Pat. No. 6,258,237 for electrophoretic diamond coating and compositions for affecting same contains the state of technology information reproduced below.

The present invention is of method and composition which can be used the fabrication of diamond coatings or free standing products. Specifically, the present invention can be used for the fabrication of such coatings under ambient temperature and pressure conditions, in increased growth rate, featuring improved thickness control and uniformity on irregular shapes, over a variety of substrate materials. Most specifically, the present invention can be used for the fabrication of such coatings on the surface of substrates, such as of milling cutters, bites (inserts), end mills and drills each having an excellent scale-off (or peeling-off) resistance, various abrasion (wear) resistant members such as valves and bearings, and substrates acting as heat sinks for electronic parts.

U.S. Pat. No. 5,099,311 for a microchannel heat sink assembly contains the state of technology information reproduced below.

Heat generation is a common problem with semiconductor devices such as integrated circuits. Temperature buildup can reduce the lifetime of semiconductor components, change their electrical characteristics, and at high temperatures, sufficiently degrade the semiconductor junction to render the circuit useless. Most consumer electronic devices rely on passive cooling, or use fans to cool electrical components. However, these cooling means are inadequate for high performance circuits, such as those that must dissipate a very large amount of power, or for closely packed circuits, or circuits that are designed to function extremely quickly. In such circuits, heat buildup is a factor that can limit system performance. If available, a more aggressive, more powerful cooling means can be used to provide better performance. Active cooling means, including forced coolant flow systems, have been used with integrated circuits. For example, a so-called "thermal conduction module", comprising a complicated structure including pistons and springs, is presently used in IBM products. Microchannels, which are small microscopic channels formed in silicon wafers, have been disclosed to be effective heat sinks for integrated circuits. When a coolant is forced through such microchannel coolers, it has been demonstrated that a large amount of heat can be removed from a small area. For example, Tuckerman, in U.S. Pat. No. 4,573,067 discloses a semiconductor chip including microscopic channels defined by fins in intimate contact with the chip. The microscopic channels are enclosed by a cover, to enclose the channels. Fluid flow through the channels is disclosed to be approximately laminar. Microchannels themselves have received much attention. However, little attention has been focused on the means for delivery of coolant to the microchannels.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

The inventor's apparatus, systems, and methods produce a complex product by designing a three dimensional preform of the complex product; creating a three dimensional preform of the complex product; depositing a material on the preform; and removing the preform to produce the complex product. In one embodiment, the inventor's apparatus, systems, and methods produce a complex product by designing a three dimensional preform of the complex product; creating a three dimensional preform of the complex product; depositing a metal and non-metal on the preform; and removing the preform to produce the complex product. In another embodiment, the inventor's apparatus, systems, and methods produce a complex product by designing a three dimensional preform of the complex product; creating a three dimensional preform of the complex product; depositing a material that incudes metal on the preform; and removing the preform to produce the complex product. In yet another embodiment, the inventor's apparatus, systems, and methods produce a complex product by designing a three dimensional preform of the complex product; creating a three dimensional preform of the complex product; depositing a material that incudes metal and non-metal on the preform; and removing the preform to produce the complex product. In another embodiment, the inventor's apparatus, systems, and methods produce a complex product by designing a three dimensional preform of the complex product; creating a three dimensional preform of the complex product; using electrophoretic deposition for depositing diamond nanoparticles on the preform and using electroplating for depositing copper nanoparticles on the preform; and removing the preform to produce the complex product.

The inventor's apparatus, systems, and methods have use producing a complex product. In one embodiment the inventor's apparatus, systems, and methods have use producing a complex heat sink. The heat sink has use in heat dissipation in power electronics, light emitting diodes and microchips. The heat sink has use in temperature regulation of a substrate. In other embodiments the inventor's apparatus, systems, and methods have use in producing complex heat pipes, micro-thrusters, micro-combustion chambers for propulsion systems, micro-nozzles for aerodynamic separation of gases, and microscale chemical synthesis reactors or analysis systems also known as lab-on-a-chip devices The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

DETAILED DESCRIPTION OF SPECIFIC EMBODIMENTS

Figure 1:
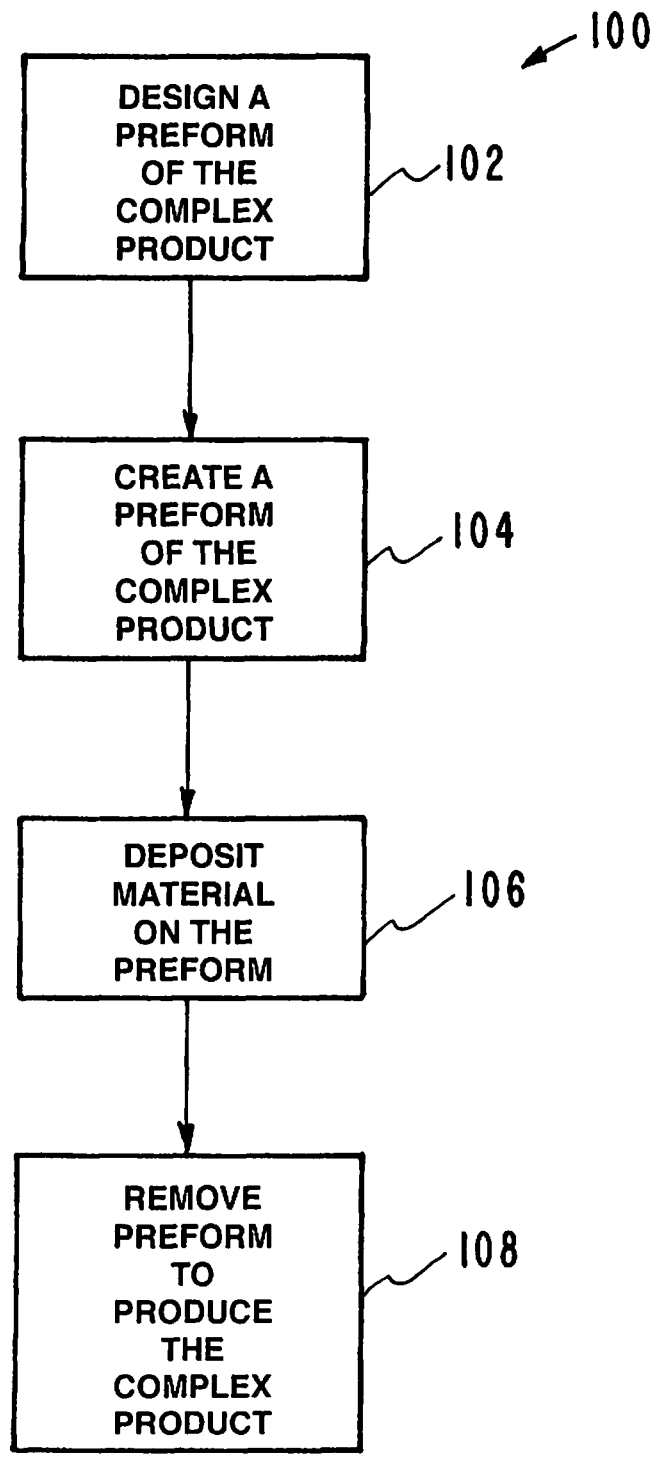
FIG. 1 is a flow chart illustrating the inventor's apparatus, systems, and methods for producing a complex product.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

The inventor's apparatus, systems, and methods produce a complex product by designing a three dimensional preform of the complex product; creating a three dimensional preform of the complex product; depositing a material on the preform; and removing the preform to produce the complex product. In one embodiment the inventor's apparatus, systems, and methods produce a complex product by designing a three dimensional preform of the complex product; creating a three dimensional preform of the complex product; depositing a material on the preform wherein the material includes metal; and removing the preform to produce the complex product. Examples of the metal include copper, aluminum, iron, nickel, silver, and other metals.

In another embodiment the inventor's apparatus, systems, and methods produce a complex product by designing a three dimensional preform of the complex product; creating a three dimensional preform of the complex product; depositing a material on the preform wherein the material includes metal and non-metal; and removing the preform to produce the complex product. Examples of the non-metal include diamonds, silicon, quartz, and other non-metals.

Modeling is used to design the three dimensional preform of the complex product. The modeling can be accomplished using computer aided design. A three dimensional preform of the complex product is created using the model. The three dimensional preform can be created by lithography, stereo micro lithography, and other methods. In different embodiments, the depositing of copper and diamonds on the preform includes electrodeposition, electrophoretic deposition, and electrophoretic deposition and plating for depositing a material including metal on the preform. In one embodiment the inventor's system provides a complex microchannel heat sink. The heat sink can be used in heat dissipation in power electronics, light emitting diodes and microchips. Due to the mild processing conditions, it is possible to build a heat sink with this method directly onto a semiconductor substrate.

The preform can be constructed out of any material that can be subsequently removed during the processing step.

The materials can include polylactic acid, paralyene, acrylates, or waxes. Modeling is used to design the three dimensional preform of the complex product which can include micron and nanometer scale features. In different embodiments the modeling includes computer aided design, lithography, and stereo micro lithography. In different embodiments, the depositing of copper and diamonds on the preform includes electrodeposition, electrophoretic deposition, and electrophoretic deposition and plating for depositing a material including metal on the preform.

Referring to the drawing and in particular to FIG. 1, a flow chart illustrates the inventor's apparatus, systems, and methods for producing a complex product. The Inventor's apparatus, systems, and methods are designated generally by the reference numeral 100. As illustrated in the flow chart of FIG. 1, the inventor's system includes a number of steps. Designing a three dimensional preform of the complex product is step 1. Creating a three dimensional preform of the complex product is step 2. Depositing a material on the preform is step 3. Removing the preform to complete the complex product is step 4.

In step 1, designated by the reference numeral 102, modeling is used to design the three dimensional preform of the complex product. In different embodiments the modeling includes computer simulation, computer aided design and other modeling techniques. In step 2, designated by the reference numeral 104, a three dimensional preform of the complex product is created. In different embodiments the method of creation is lithography, stereo micro lithography, two photon lithography, fused deposition modeling, direct ink writing, and computer numerical control milling.

In step 3, designated by the reference numeral 106, the depositing of a material on the preform can include electrodeposition, electrophoretic deposition, and electrophoretic deposition and plating for depositing copper and diamonds on and around the preform. In one embodiment the depositing of a material on the preform uses electrophoretic deposition and plating for depositing the material on the preform.

In step 4, designated by the reference numeral 108, the removal of the preform can include thermal decomposition of the preform to remove the preform to complete. For example, sintering the preform can be used to remove the preform to complete the complex product.

In one embodiment the Inventor's system provides a complex heat sink. The heat sink can be used in heat dissipation in power electronics, light emitting diodes and microchips.

Figure 2:
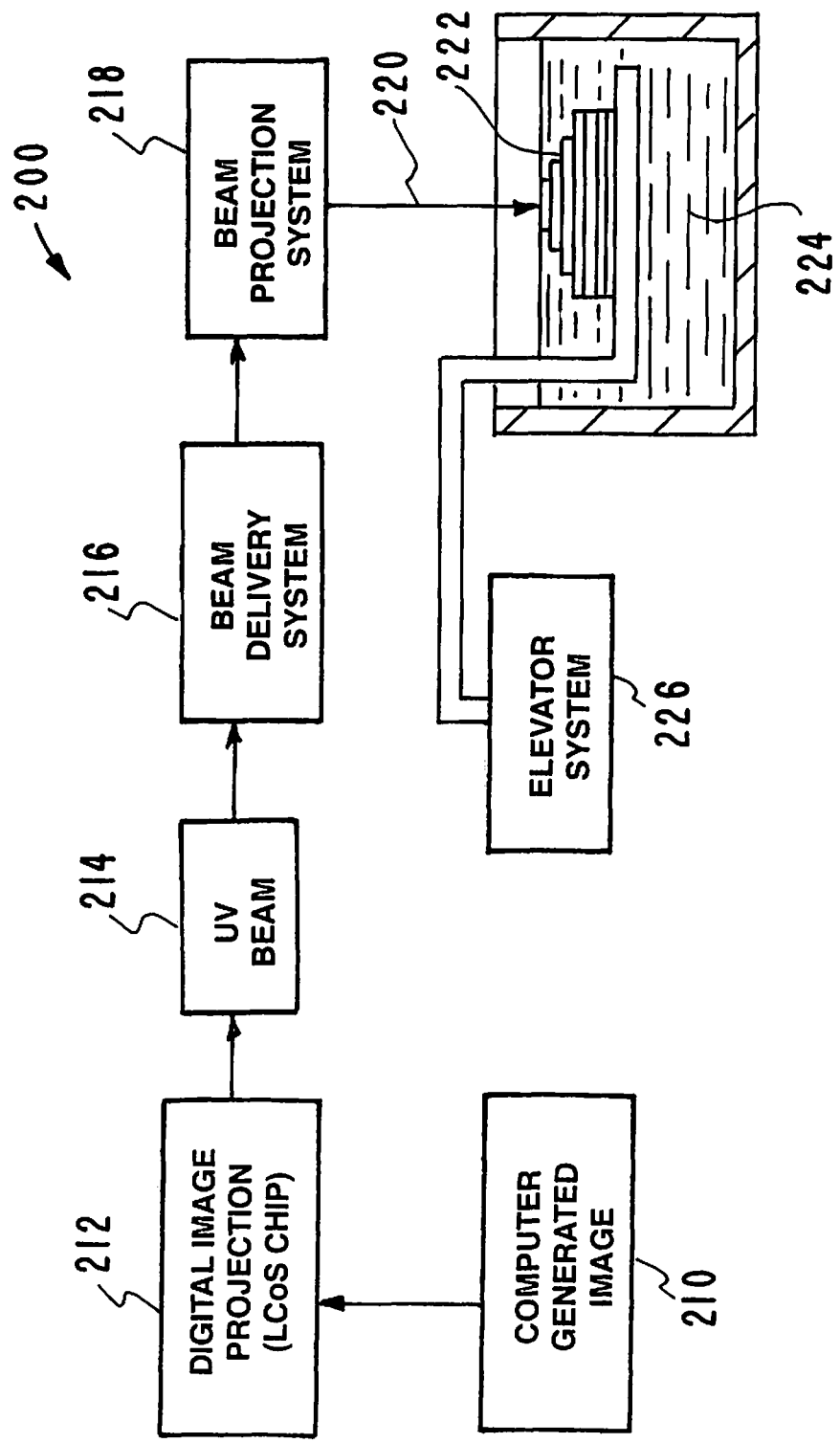
FIG. 2 illustrates a stereo micro lithography system for preparing the preform for the inventor's apparatus, systems, and methods for producing a complex product.

The Inventor's apparatus, systems, and methods have use producing other complex products. In one embodiment the Inventor's apparatus, systems, and methods have use in producing complex heat pipes, micro-thrusters, micro-combustion chambers for propulsion systems, micro-nozzles for aerodynamic separation of gases, and microscale chemical synthesis reactors and analytical devices also known as lab-on-a-chip devices As illustrated in step 2 of FIG. 1, several methods may be used to create the three dimensional preform of the complex product. In different embodiments the modeling includes lithography, stereo micro lithography, two photon lithography, fused deposition modeling, direct ink writing, and computer numerical control milling. FIG. 2 illustrates a stereo micro lithography system for preparing the preform for the inventor's apparatus, systems, and methods for producing a complex product is illustrated. The stereo micro lithography system is designated generally by the reference numeral 200. A series of steps are used in stereo micro lithography system 200.

In the first step 210, a computer generated image is produced. A 3D solid model is designed by any suitable method, e.g., by bit mapping or by computer aided design (CAD) software at a PC/controller. The model is electronically sliced into series of 2-dimensional data files, i.e., 2D layers, each defining a planar cross section through the 3D preform of the complex product to be constructed, and which may be individually stored.

In the next step, step 212, a digital image is projected. A Lcos chip is used for the projection.

The next step, step 214, is the projection of a UV beam.

The next step, step 216, uses a beam delivery system to produce a beam containing the preform image information.

The next step, step 218, uses a beam projection system to project the preform image in focus at a particular plane in a photoresist/photo-curable composition in a supporting container so that the actinic light preferentially exposes the desired layer to cure it. The projecting beam 220 is directed into the photoresist/photo-curable composition 224. After one layer is cured the composition and focusing optics undergo relative movement by an elevator system 226 that moves the cured layer down and a second layer of fresh photoresist is formed to be exposed. The layer-by-layer process continues until the 3D preform of the complex product 222 is completed. The 3D preform of the complex product 222 can be made of a polymer or other material adapted for use in additional processing steps.

Figure 3A:
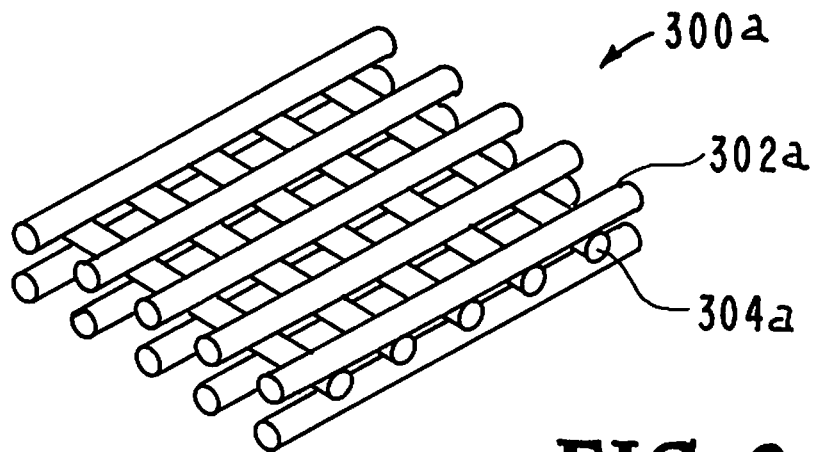
FIG. 3A illustrates one embodiment of a three dimensional preform of the complex product.

Referring now to FIG. 3A, one embodiment of a three dimensional preform of the complex product is illustrated. The embodiment of a three dimensional preform is designated generally by the reference numeral 300a. The three dimensional preform 300a includes a first matrix of parallel preform micro channel segments 302a and a second matrix of parallel preform micro channel segments 304a. The preform micro channel segments 302a and the micro channel segments 304a are positioned perpendicular.

Figure 3B:
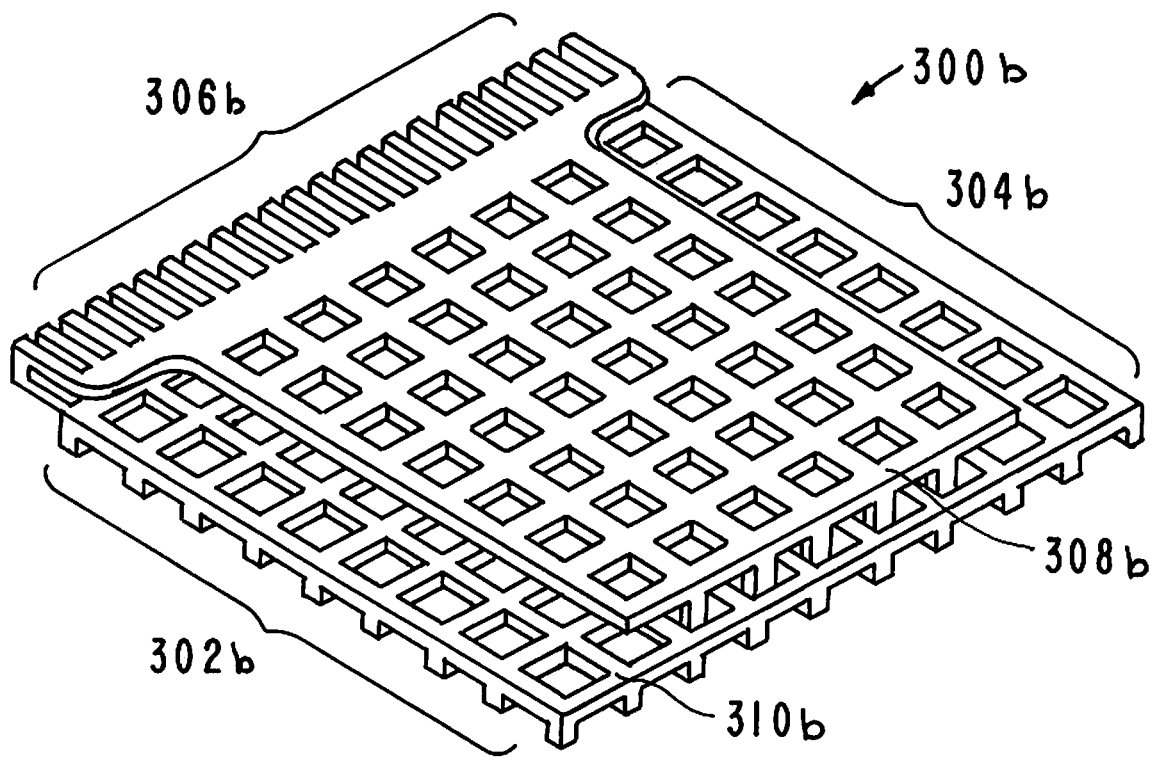
FIG. 3B illustrates an example of a three dimensional preform of a complex micro heat sink.

Referring now to FIG. 3B, art example of a three dimensional preform of a complex micro heat sink is illustrated. The three dimensional preform of a complex micro heat sink is designated generally by the reference numeral 300b. The preform of a micro heatsink 300b includes a first heat transfer section 302b. The first heat transfer section 302b includes a multiplicity of first preform of micro channels 308b adapted to contain a heat transfer fluid. The micro heatsink 300b also includes a second heat transfer section 304b spaced from the first heat transfer section. The second heat transfer section 304b includes a multiplicity of second preform of micro channels 310b adapted to contain the heat transfer fluid. A preform of a connection section 306b is located between the first heat transfer section 302b and the second heat transfer section 304b.

FIGS. 4A, 4B, 4C and 4D are a series of figures that illustrate the inventor's method for producing a complex product. The method includes individual steps used in designing a three dimensional complex product.

Figure 4A:
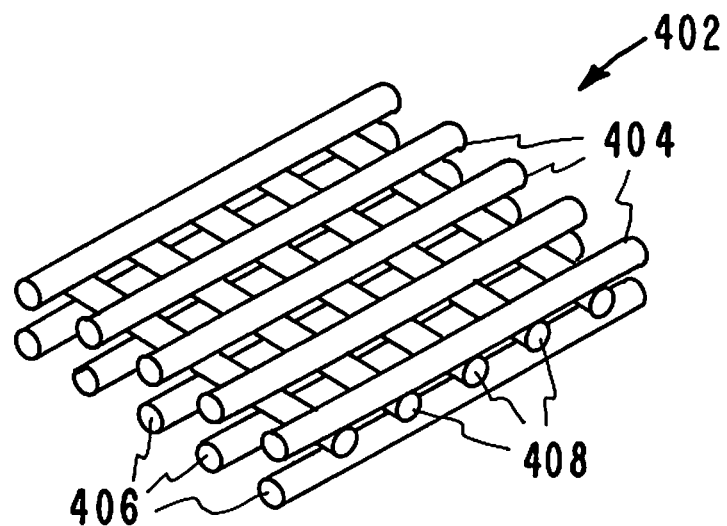
FIGS. 4A, 4B, 4C, and 4D illustrate one embodiment of the inventor's method for producing a complex product.

FIG. 4A illustrates a preform 402 used in designing a three dimensional complex product. The three dimensional preform 402 includes a first parallel matrix of preform micro channel segments 404 and a second parallel matrix of parallel preform micro channel segments 406. The preform micro channel segments 404 and the preform micro channel segments 406 are parallel to each other and spaced from each other. A perpendicular matrix of preform micro channel segments 408 are positioned in the space between preform micro channel segments 404 and the preform micro channel segments 406. The preform micro channel segments 408 are parallel to each other and perpendicular to the preform micro channel segments 404 and the preform micro channel segments 406.

Figure 4B:
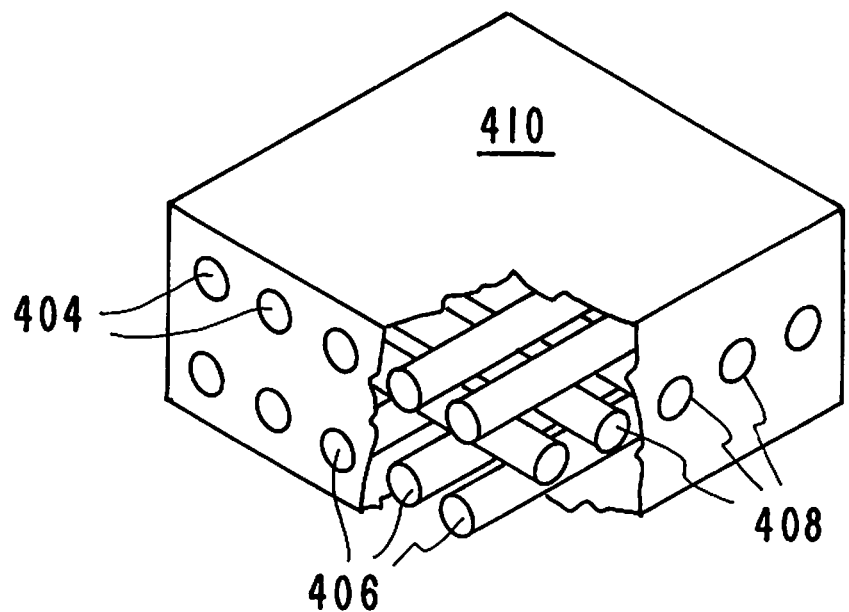

FIG. 4B illustrates the complex product after the step of depositing a material on the preform. The depositing of a material on the preform can be accomplished using electrodeposition, electrophoretic deposition, or electrophoretic deposition and plating. The preform micro channel segments 404 and the preform micro channel segments 406 are shown covered with the material 410.

Figure 4C:
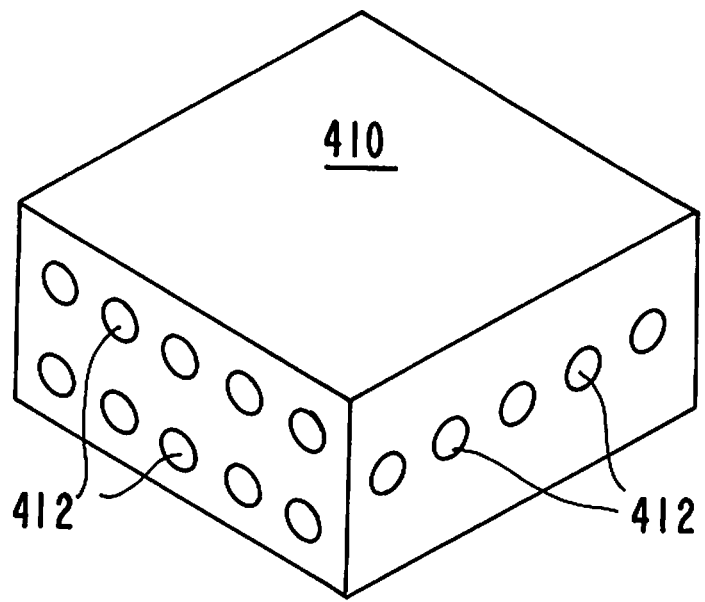

FIG. 4C illustrates the complex product after the step of removal of the preform 402 leaving the void spaces 412. The material 410 with the void spaces 412 forms the three dimensional complex product. The void spaces 412 provide cooling fluid channels in the material 410.

Figure 4D:
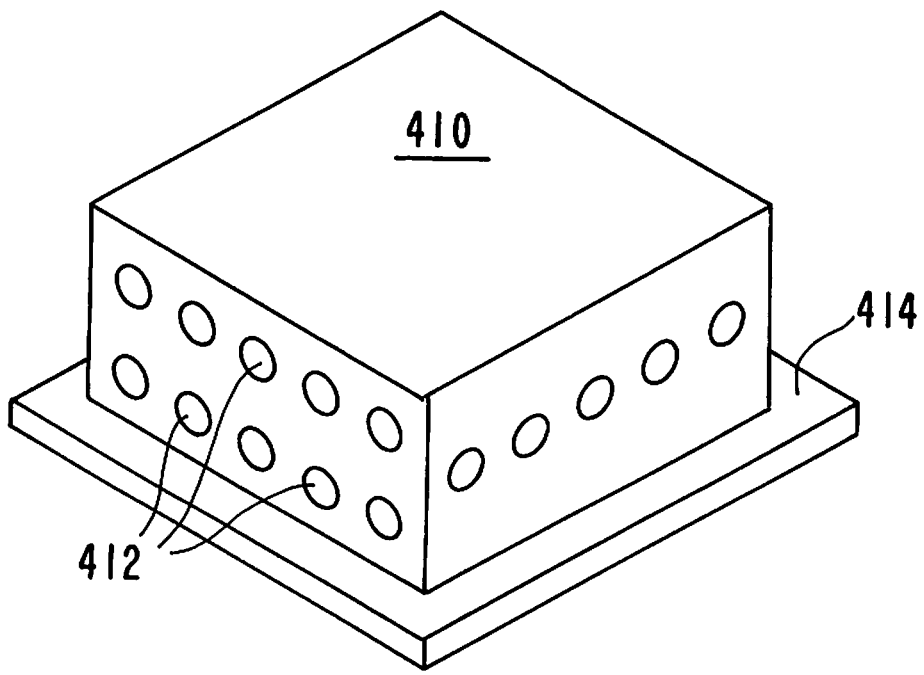

FIG. 4D illustrates the complex product mounted on a semiconductor substrate 414. The complex product is made of the material 410 with the void spaces 412. The void spaces 412 provide cooling fluid channels in the material 410. When the complex product is mounted on the semiconductor substrate 414, the void spaces 412 provide fluid channels for a cooling fluid that cools the components on the semiconductor substrate 414.

Figure 5:
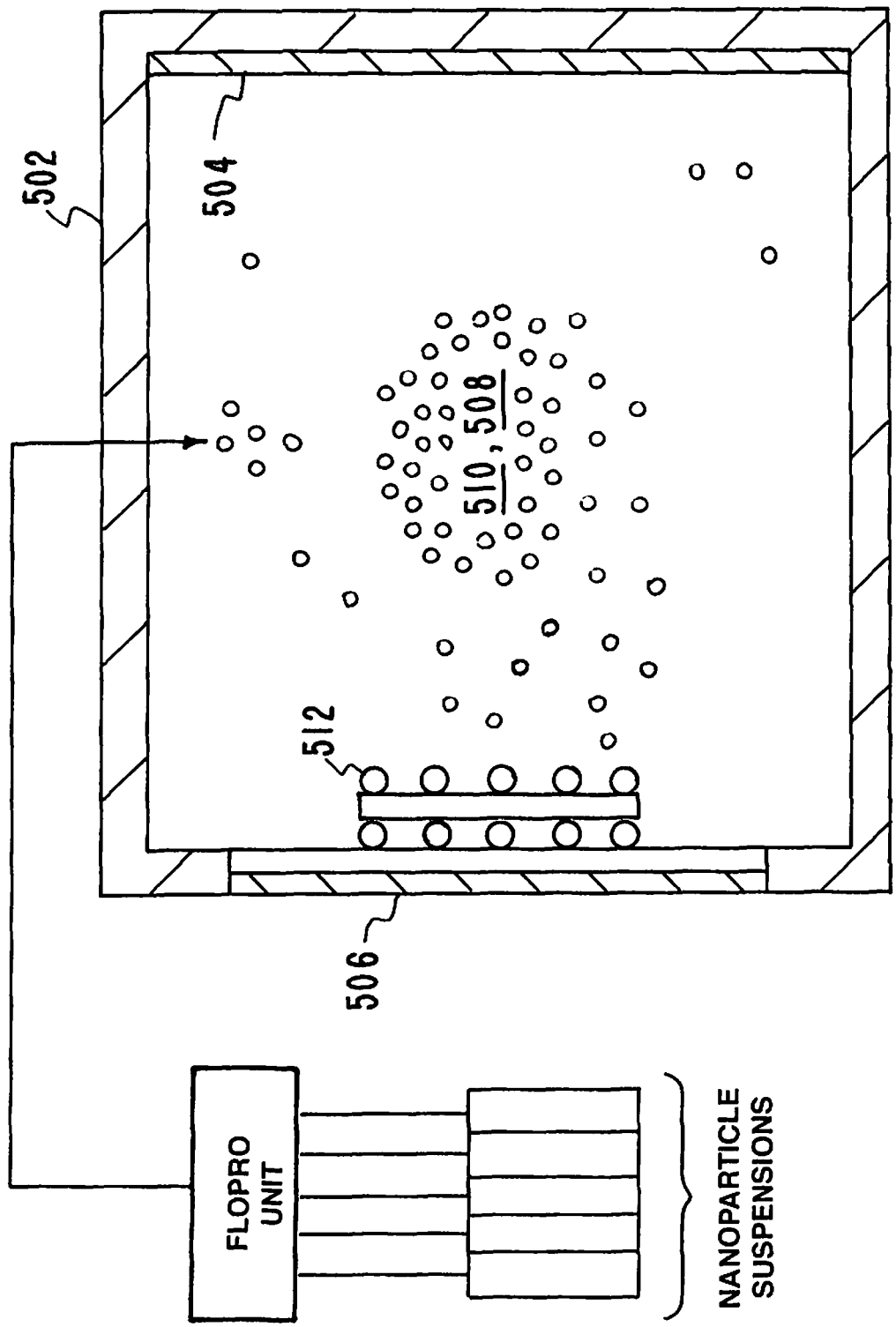
FIG. 5 illustrates one embodiment of the inventor's system for depositing a material on the preform.

Referring to FIG. 5, the inventor's system for depositing a material on the preform is illustrated. The system is designated generally by the reference numeral 500. The depositing of a material on the preform can be accomplished using electrodeposition, electrophoretic deposition, electrophoretic deposition and plating, and other methods of depositing a material.

The system 500 illustrated in FIG. 5 is a system that includes both (1) electrophoretic deposition and (2) electrophoretic deposition and plating. A deposition chamber 502 includes electrodes 504 and 506. Nanoparticle suspensions are introduced into the deposition chamber 502. The nanoparticle suspensions generally contain micron and/or nanometer scale particles. In one embodiment, the nanoparticle suspensions include copper metal 508 and diamond particles 510. The copper metal 508 and diamond particles 510 are deposited on the preform 512. In one operation of the system electrophoretic deposition is used to deposit the copper metal 508 and diamond particles 510 on the preform 512. In another operation electrophoretic deposition is used to deposit diamond particles 510 on the preform 512 and plating is used to deposit the copper metal 508 on the preform 512.

Figure 6:
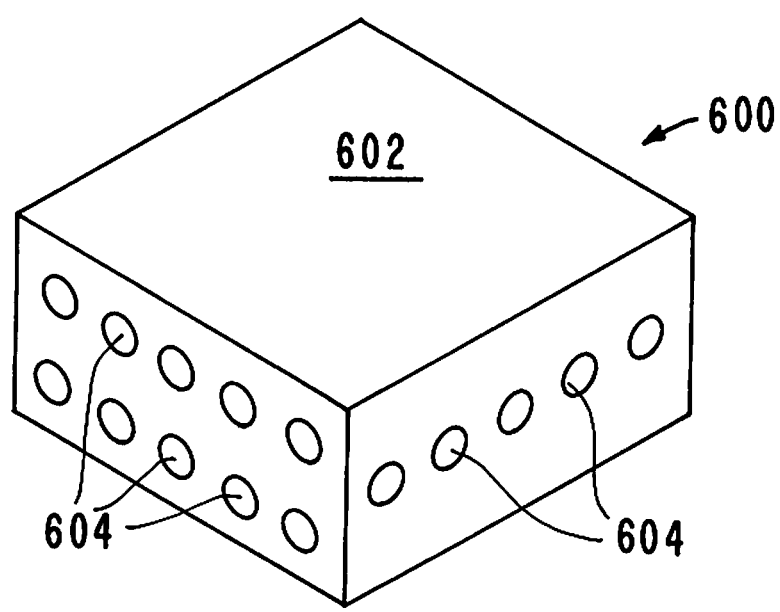
FIG. 6 illustrates one embodiment of a three dimensional complex product produce by the inventor's system.

Referring now to FIG. 6, an example of a complex micro heat sink product is illustrated. The three dimensional micro heat sink is designated generally by the reference numeral 600. The three dimensional micro heat sink product 600 includes a matrix of cooling micro channels 604 in a copper diamond body 602. The three dimensional micro heat sink product 600 is produced by the steps of designing a three dimensional preform of the complex product, depositing copper and diamonds on the preform, and removing the preform to complete the complex product. The finished product can be bonded to a semiconductor substrate in step 4.

The depositing of copper and diamonds on the preform includes electrodeposition, electrophoretic deposition, and electrophoretic deposition and plating for depositing copper and diamonds on the preform. In one embodiment the depositing copper and diamonds on the preform uses electrophoretic deposition and plating for depositing copper on the preform. The Inventor's heat sink has use in heat dissipation in power electronics, light emitting diodes and microchips. The heat sink has use in temperature regulation of a substrate.

Figure 7A:
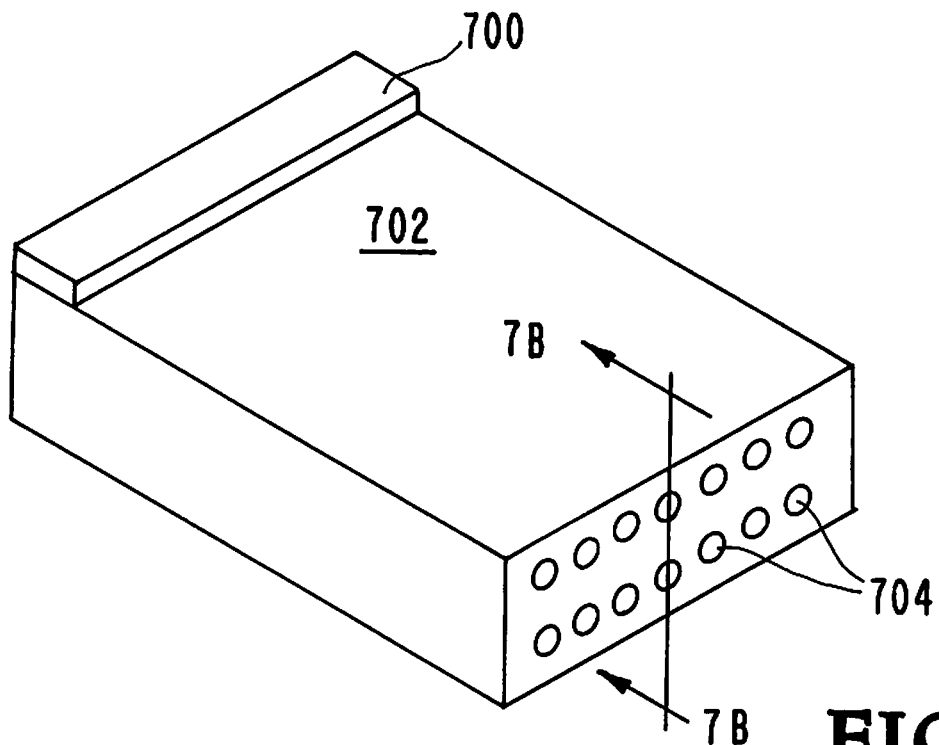
FIGS. 7A and 7B illustrate another embodiment of a three dimensional complex product produce by the inventor's system.
Figure 7B:
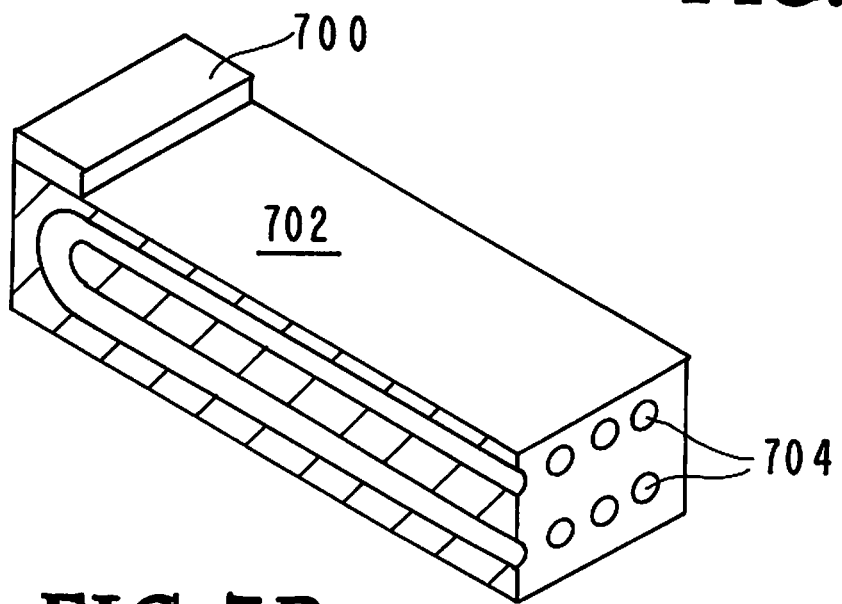

Referring now to FIGS. 7A and 7B, one embodiment of a three dimensional complex product is illustrated. FIG. 7A shows a complex micro heat sink product produced by the Inventor's system and method. The main body section of the micro heatsink is identified by the reference numeral 702. A laser diode bar 700 is shown positioned on the main body section 702 of the micro heatsink. Heat is transferred from the laser diode bar 700 to the heat sink. The main body section 702 includes a multiplicity of micro channels 704 adapted to channel a heat transfer fluid to provide heat transfer from the main body section 702.

FIG. 7A shows a cut away portion of the micro heat sink. As shown in FIG. 7B, the laser diode bar 700 is positioned on the main body section 702. Heat is transferred from the laser diode bar 700 to the main body section 702. A multiplicity of micro channels 704 are adapted to channel a heat transfer fluid to provide heat transfer from the main body section 702. The micro channels 704 provide a continuous flow pathway for channeling the heat transfer fluid from the main body section 702.

The micro heatsink is produced by a series of steps to produce a preform of the micro heatsink, deposit a material including metal on the preform, and remove the preform by thermal dissolution to complete the micro heatsink. Modeling is used to design the preform of the micro heatsink. The modeling can be done by computer aided design, lithography, and/or stereo micro lithography. The depositing of a material that includes metal on the preform can be accomplished by electrodeposition, electrophoretic deposition, and/or electrophoretic deposition and plating for depositing the material on the preform. The removal of the preform can be accomplished by sintering the preform to remove the preform.

Figure 8A:
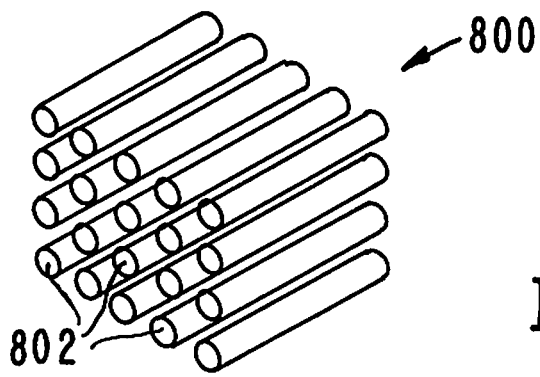
FIGS. 8A, 8B, and 8C illustrate a complex micro heat pipe product produce by the inventor's system.
Figure 8B:
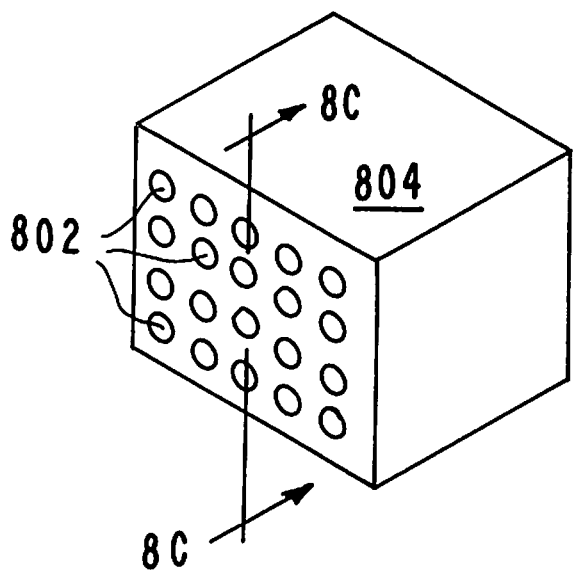
Figure 8C:
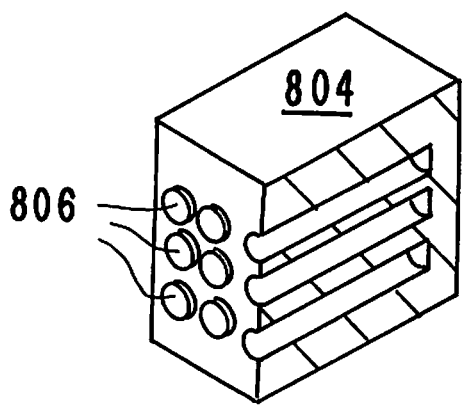

Referring now to FIGS. 8A, 8B and 8C; an example of a complex micro heat pipe array product produced by the inventor's system and method is illustrated. The three dimensional micro heat pipe is designated generally by the reference numeral 800.

FIG. 8A shows a preform for the complex micro heat pipe product produced by the inventor's system and method. Modeling is used to design the preform of the micro heat pipe. The modeling can be done by computer aided design, lithography, and/or stereo micro lithography.

FIG. 8B shows the depositing of a material that includes metal on the preform 802. The material that includes metal is designated by the reference numeral 804. The depositing of a material that includes metal on the preform can be accomplished by electrodeposition, electrophoretic deposition, and/or electrophoretic deposition and plating for depositing the material on the preform.

The removal of the preform 802 can be accomplished by sintering the preform to remove the preform. The removal of the preform 802 leaves micro channels adapted to contain a heat pipe fluid.

FIG. 8C is a cut away view of the micro heat pipe 800. The micro heat pipe 800 includes the micro channels adapted to contain a heat pipe fluid. Caps 806 close the micro channels 806.

Figure 9:
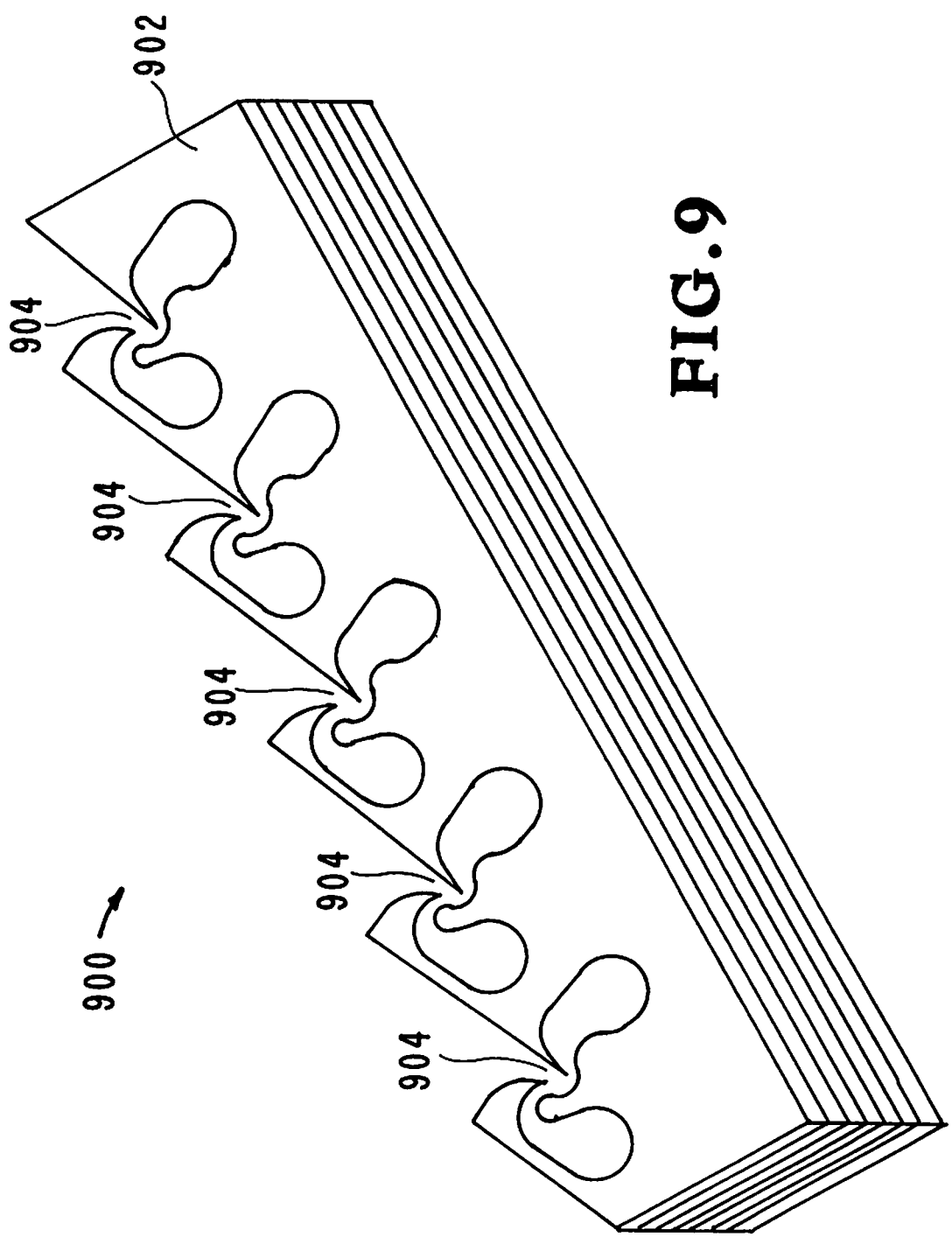
FIG. 9 illustrates a complex micro gas nozzle system produce by the inventor's method.

Referring now to FIG. 9, a complex micro gas separation nozzle system produced by the inventor's method is illustrated. The micro gas separation nozzle system is designated generally by the reference numeral 900. The micro gas separation nozzle system 900 is the type of aerodynamic nozzle invented and developed by E. W. Becker and his associates that has been one or the most successful of all the aerodynamic processes.

The micro gas separation nozzle system 900 includes a main body section 902 and a multiplicity of individual nozzle modules in the main body section 902. A jet of gas consisting of roughly 96 percent hydrogen and 4 percent $UF_6$ is allowed to expand through the narrow slits 904 of the multiplicity of nozzles in the main body 902. The gas moves at high speeds (comparable to those at the periphery of a modern centrifuge) parallel to a semicircular wall of very small radius of curvature. If the speed of the gas is 400 m/s, and the radius of curvature is 0.1 mm, then the centrifugal acceleration achieved is $1.6 \times 10^9$ m/s$^2$ or 160 million times gravity. The accelerations exceed even the high values achieved in centrifuges by a factor of a thousand or more, and they are achieved in an apparatus with no moving parts. The centrifugal forces on the molecules cause the streamlines of the heavier components of the gas to move closer to the curved wall than those of the lighter components as the gas flows around the semicircle. At the other side, where the gas has changed direction by 180°, a sharp 'skimmer' separates the flow into an inner light fraction and an outer heavy fraction.

The micro gas separation nozzle system 900 is produced by a series of steps to produce a preform of the micro gas separation nozzle system 900, then deposit a material including metal on the preform, and finally remove the preform by thermal dissolution to complete the micro gas separation nozzle system 900. Modeling is used to design the preform of the micro gas separation nozzle system 900. The modeling can be done by computer aided design, lithography, and/or stereo micro lithography. The depositing of a material that includes metal on the preform and be accomplished by electrodeposition, electrophoretic deposition, and/or electrophoretic deposition and plating for depositing the material on the preform. The removal of the preform can be accomplished by sintering the preform to remove the preform.

Figure 10:
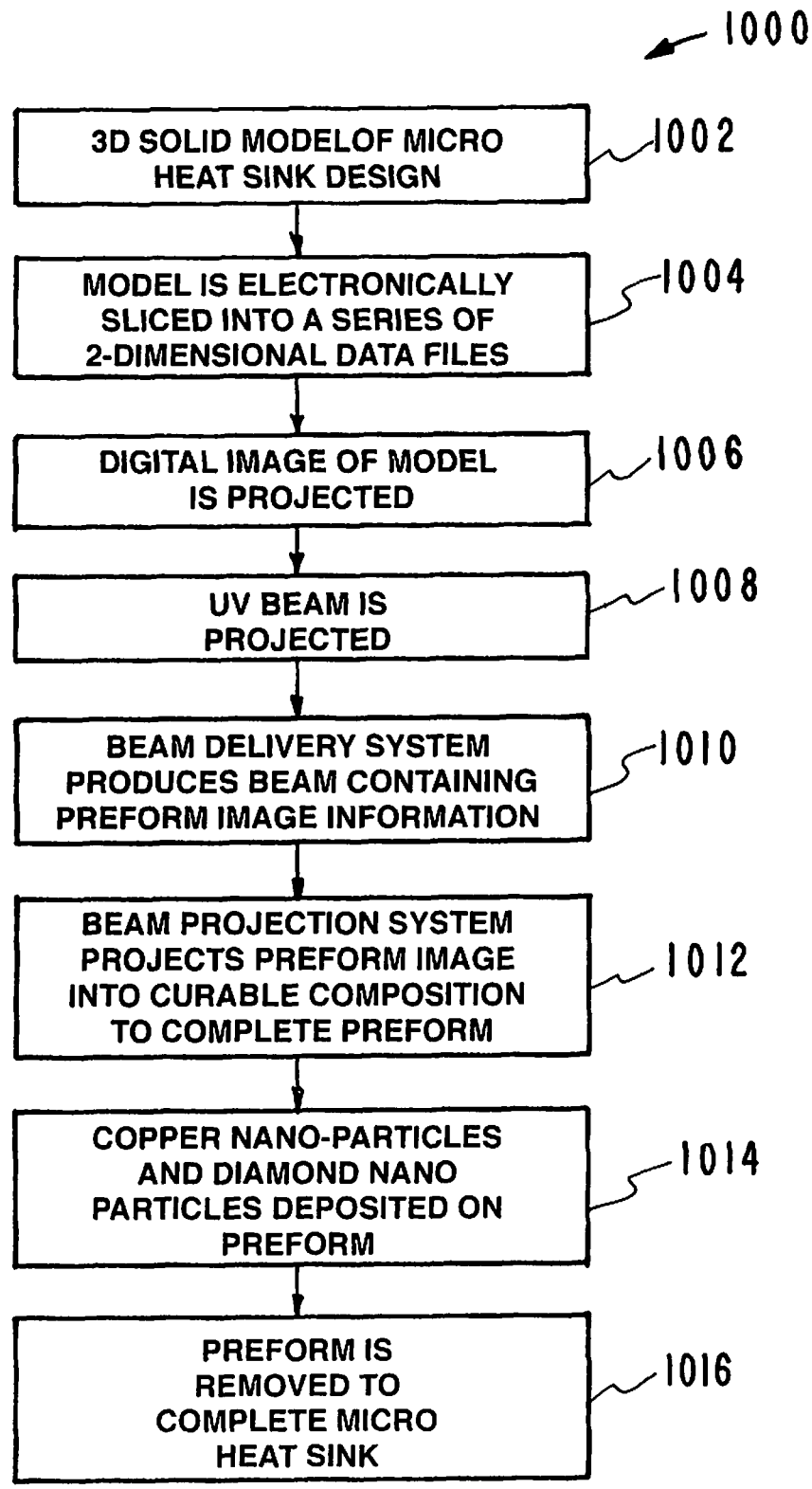
FIG. 10 is a flow chart illustrating another embodiment of the inventor's apparatus, systems, and methods for producing a complex product.

Referring to FIG. 10, a flow chart illustrates the inventor's system for producing a micro heatsink using stereo micro lithography to produce a preform of the micro heatsink and using electrophoretic deposition for depositing copper nanoparticles and diamond nanoparticles on said preform. The Inventor's system is designated generally by the reference numeral 1000. Stereo micro lithography modeling is used to design a three dimensional preform of the micro heatsink. As illustrated in the flow chart of FIG. 10, the inventor's system includes a number of steps in producing the micro heatsink.

In the step designated by the reference numeral 1002, a 3D solid model of the micro heatsink is designed by any suitable method, e.g., by bit mapping or by computer aided design (CAD) software at a PC/controller.

In the step designated by the reference numeral 1004, the CAD model of the micro heatsink is electronically sliced into series of 2-dimensional data files, i.e., 2D layers, each defining a planar cross section through the micro heatsink to be constructed, and which may be individually stored.

In the step designated by the reference numeral 1006, a digital image is projected. A Lcos chip is used for the projection. In one example of the projection, each 2D layer data is used to control a DMD display via the PC. A beam shutter, which may be an electronic or mechanical shutter, or any other type, is controlled by the PC and in turn controls a light beam which then travels through a beam homogenizer and a narrow band filter, impinging on a mirror of a prism to reflect therefrom to a DMD chip.

In the step designated by the reference numeral 1008, a UV beam is projected.

In the step designated by the reference numeral 1010, a beam delivery system produces a beam containing the preform image information of the micro heat sink.

In the step designated by the reference numeral 1012, a beam projection system projects the preform image in focus at a particular plane in a photoresist/photo-curable composition to cure and completed the preform of the micro heat sink.

In the step designated by the reference numeral 1014, copper nanoparticles and diamond nanoparticles are deposited on the preform of the micro heat sink by electrophoretic deposition.

In the step designated by the reference numeral 1016, the preform is removed to complete the micro heat sink. For example, the polymer preform of the micro heat sink can be removed by sintering.

The Inventor's apparatus, systems, and methods have use producing a complex heat sink. The heat sink has use in heat dissipation in power electronics, light emitting diodes and microchips. The heat sink has use in temperature regulation of a substrate.

Figure 11A:
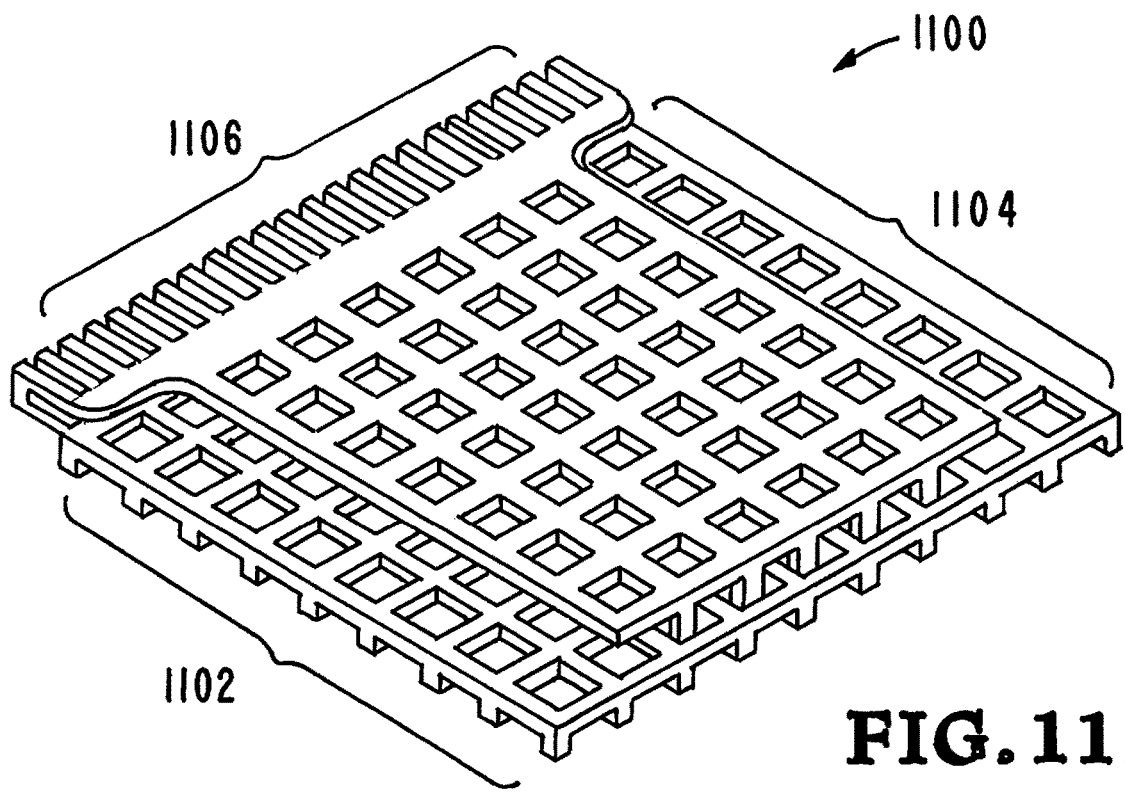
FIGS. 11A, 11B, and 11C illustrate an embodiment of the inventor's method for producing a complex heat sink product.
Figure 11B:
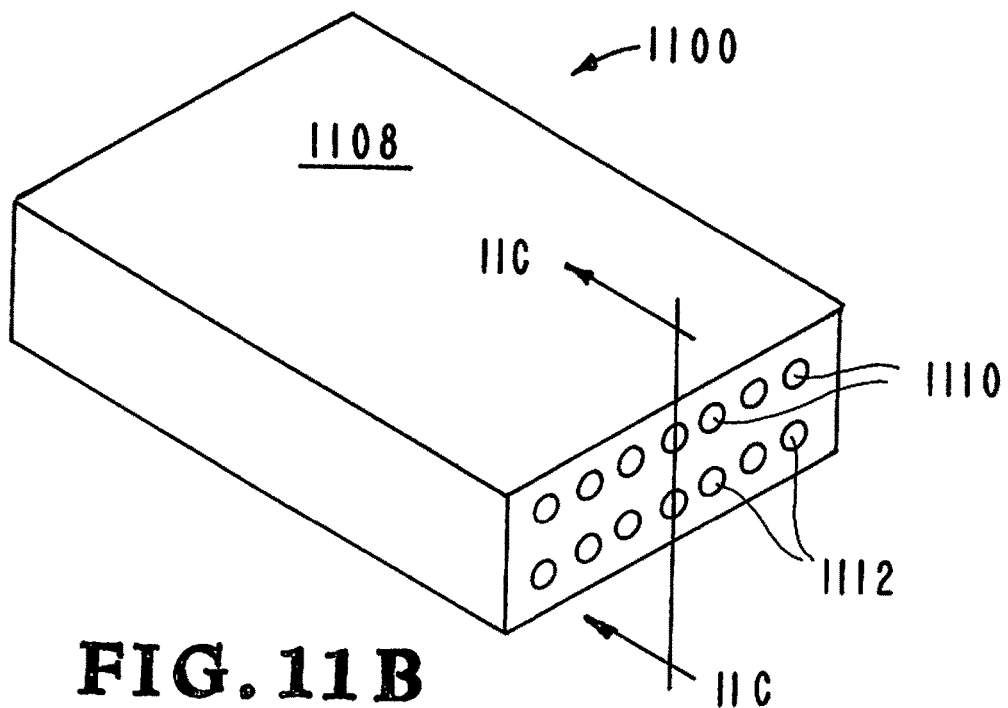
Figure 11C:
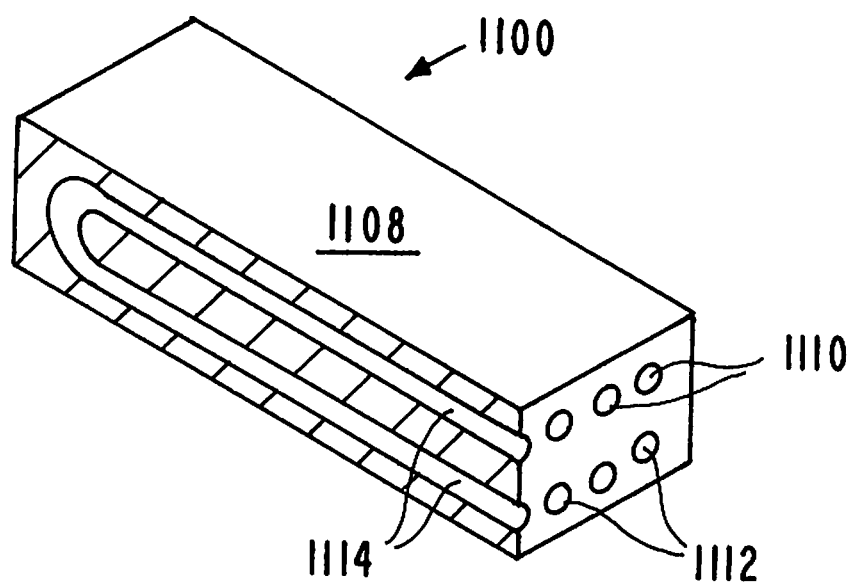

Referring now to FIGS. 11A, 11B, and 11C; an embodiment of the inventor's complex heat sink product and the inventor's method for producing a complex heat sink product are illustrated. This embodiment of the inventor's complex heat sink is designated generally by the reference numeral 1100.

FIG. 11A shows a preform for the complex heat sink product. Modeling is used to design the preform of the heat sink. The modeling can be done by computer aided design, lithography, and/or stereo micro lithography. The preform for the heat sink 1100 includes a first matrix section 1102, a second matrix section 1104, and a connection section 1106.

FIG. 11B shows a complex micro heat sink product produced by the Inventor's system and method. The micro heatsink includes a main body section 1108. The main body section 1108 includes a multiplicity of internal micro channels that correspond to the first matrix section 1102, the second matrix section 1104, and the connection section 1106 of the preform shown in FIG. 11A. Holes 1110 and 1112 are drilled into the main body section 1108 to connect with the internal micro channels. The holes 1110 and 1112 and the internal micro channels are adapted to channel a heat transfer fluid to provide heat transfer.

FIG. 11C shows a cut away portion of the micro heat sink. As shown in FIG. 11C, the main body section 1102 includes micro channels 1114 adapted to channel the heat transfer fluid to provide heat transfer from the main body section 1108. The micro channels 1104 provide a continuous flow pathway for channeling the heat transfer fluid through the main body section 1108.

The micro heatsink is produced by a series of steps to produce a preform of the micro heatsink, deposit a material including metal on the preform, and remove the preform by thermal dissolution to complete the micro heatsink. Modeling is used to design the preform of the micro heatsink. The modeling can be done by computer aided design, lithography, and/or stereo micro lithography. The depositing of a material that includes metal on the preform and be accomplished by electrodeposition, electrophoretic deposition, and/or electrophoretic deposition and plating for depositing the material on the preform. The removal of the preform can be accomplished by sintering the preform to remove the preform.

Figure 12:
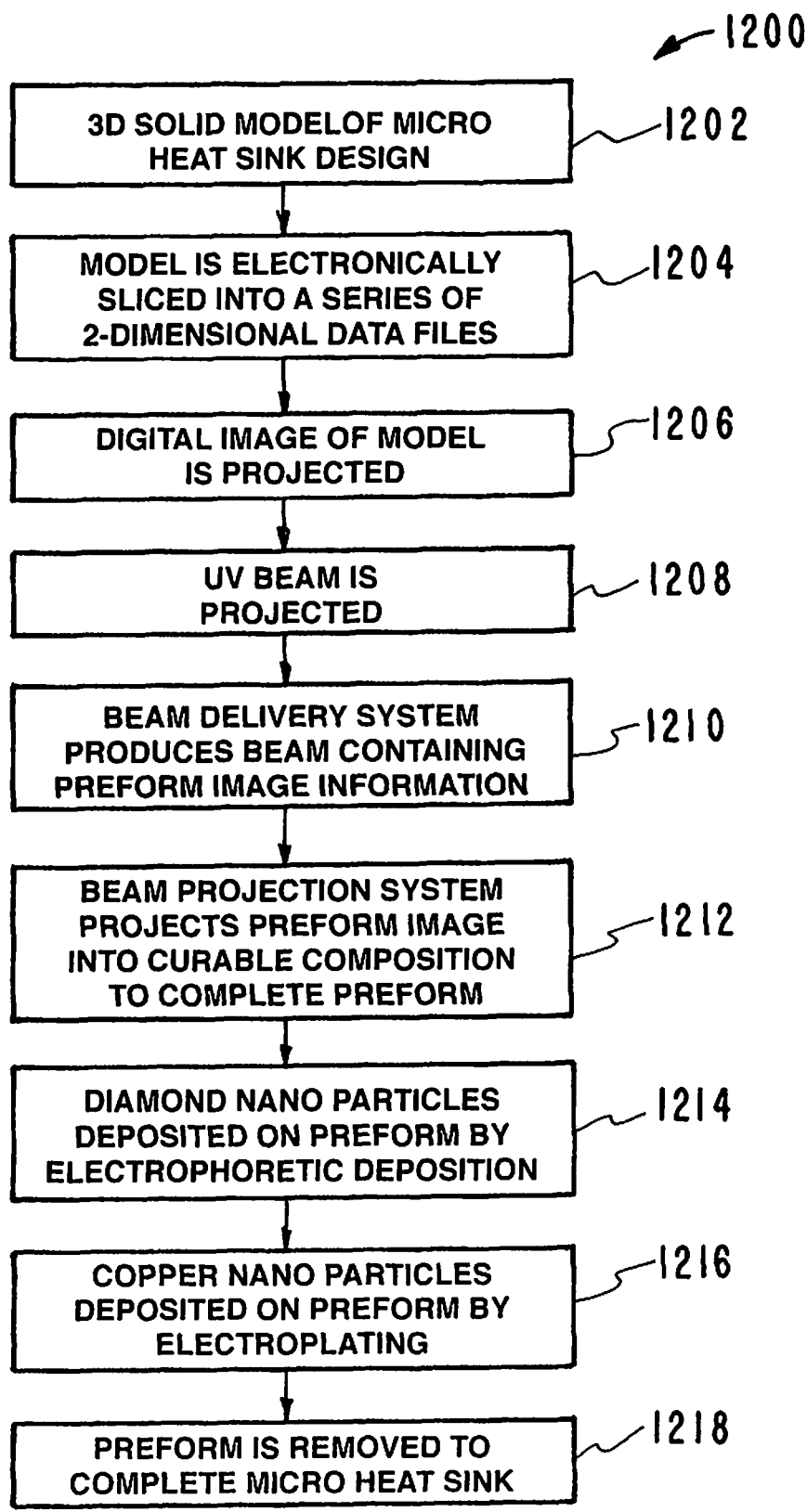
FIG. 12 is a flow chart illustrating yet another embodiment of the inventor's apparatus, systems, and methods for producing a complex product.

Referring to FIG. 12, a flow chart illustrates another embodiment of the inventor's system for producing a micro heatsink using stereo micro lithography to produce a preform of the micro heatsink, using electrophoretic deposition for depositing diamond nanoparticles on the preform, and using electroplating for depositing copper nanoparticles on the preform. This embodiment of the inventor's system is designated generally by the reference numeral 1200. Stereo micro lithography modeling is used to design a three dimensional preform of the micro heatsink. As illustrated in the flow chart of FIG. 12, the inventor's system includes a number of steps in producing the micro heatsink.

In the step designated by the reference numeral 1202, a 3D solid model of the micro heatsink is designed by any suitable method, e.g., by bit mapping or by computer aided design (CAD) software at a PC/controller.

In the step designated by the reference numeral 1204, the CAD model of the micro heatsink is electronically sliced into series of 2-dimensional data files, i.e., 2D layers, each defining a planar cross section through the micro heatsink to be constructed, and which may be individually stored.

In the step designated by the reference numeral 1206, a digital image is projected. A Lcos chip is used for the projection. In one example of the projection, each 2D layer data is used to control a DMD display via the PC. A beam shutter, which may be an electronic or mechanical shutter, or any other type, is controlled by the PC and in turn controls a light beam which then travels through a beam homogenizer and a narrow band filter, impinging on a mirror of a prism to reflect therefrom to a DMD chip.

In the step designated by the reference numeral 1208, a UV beam is projected.

In the step designated by the reference numeral 1212, a beam delivery system produces a beam containing the preform image information of the micro heat sink.

In the step designated by the reference numeral 1212, a beam projection system projects the preform image in focus at a particular plane in a photoresist/photo-curable composition to cure and completed the preform of the micro heat sink.

In the step designated by the reference numeral 1214, diamond nanoparticles are deposited on the preform of the micro heat sink by electrophoretic deposition.

In the step designated by the reference numeral 1216, copper nanoparticles are deposited on the preform of the micro heat sink by electroplating.

In the step designated by the reference numeral 1218, the preform is removed to complete the micro heat sink. For example, the polymer preform of the micro heat sink can be removed by sintering.

The Inventor's apparatus, systems, and methods have use producing a complex heat sink. The heat sink has use in heat dissipation in power electronics, light emitting diodes and microchips. The heat sink has use in temperature regulation of a substrate.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. A method of producing a complex product, the method comprising the steps of:

designing a three dimensional preform of the complex product to form a model preform by computer aided design software at using a PC controller producing a computer aided design (CAD) model of said model preform, electronically slicing said computer aided design (CAD) model into data files producing a digital image of said model preform, providing a photoresist/photo-curable composition, creating a three dimensional preform of the complex product using said model preform by projecting said digital image of said model preform into said photoresist/photo-curable composition, depositing diamond nanoparticles on said created three dimensional preform by electrophoretic deposition, depositing copper nanoparticles on said created three dimensional preform by electroplating, and removing the created three dimensional preform producing the complex product from the deposited diamond nanoparticles material and deposited copper nanoparticles material.

2. The method of producing a complex product of claim 1 wherein said step of projecting said digital image of said model preform into said photoresist/photo-curable composition comprises using a light beam for projecting said digital image of said model preform into said photoresist/photo-curable composition.

3. The method of producing a complex product of claim 2 wherein said step of using a light beam for projecting said digital image of said model preform into said photoresist/photo-curable composition comprises using an ultraviolet light beam for projecting said digital image of said model preform into said photoresist/photo-curable composition.

4. The method of producing a complex product of claim 2 wherein said step of using a light beam for projecting said digital image of said model preform into said photoresist/photo-curable composition comprises using a lcos chip for using a light beam for projecting said digital image of said model preform into said photoresist/photo-curable composition.

5. The method of producing a complex product of claim 1 wherein said model preform is a polymer model preform.

6. The method of producing a complex product of claim 5 wherein said step of removing the created three dimensional preform producing the complex product from the deposited material comprises using sintering for removing the created three dimensional polymer preform producing the complex product from the deposited material.

* * * * *